(12) United States Patent
Ficara et al.

(10) Patent No.: US 12,507,044 B2
(45) Date of Patent: Dec. 23, 2025

(54) ON-LOCATION TELEMETRY SUBSCRIPTIONS

(71) Applicant: Cisco Technology, Inc., San Jose, CA (US)

(72) Inventors: Domenico Ficara, Essertines-sur-Yverdon (CH); Pascal Thubert, Roquefort les Pins (FR); Amine Choukir, Lausanne (CH); Alessandro Erta, Licciana Nardi (IT); Salvatore Valenza, Pomy (CH); Vincent Cuissard, Eteaux (FR); Loris Gazzarrini, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 17/831,551

(22) Filed: Jun. 3, 2022

(65) Prior Publication Data

US 2023/0396968 A1    Dec. 7, 2023

(51) Int. Cl.
| | | |
|---|---|---|
| H04W 4/02 | (2018.01) | |
| H04L 67/12 | (2022.01) | |
| H04Q 9/00 | (2006.01) | |
| H04W 4/029 | (2018.01) | |
| H04W 4/38 | (2018.01) | |
| H04W 4/40 | (2018.01) | |

(52) U.S. Cl.
CPC ............... *H04W 4/38* (2018.02); *H04L 67/12* (2013.01); *H04Q 9/00* (2013.01); *H04W 4/029* (2018.02); *H04W 4/40* (2018.02)

(58) Field of Classification Search
CPC .................................................... H04W 4/38
See application file for complete search history.

(56) References Cited

U.S. PATENT DOCUMENTS

| | | | |
|---|---|---|---|
| 9,629,118 B2 | 4/2017 | Rhoads | |
| 9,794,860 B2 | 10/2017 | Hall | |
| 9,893,952 B2 | 2/2018 | Wu et al. | |
| 9,949,129 B1 | 4/2018 | Henry et al. | |
| 10,203,214 B2 | 2/2019 | Xu et al. | |
| 10,412,542 B2 | 9/2019 | Kim et al. | |
| 11,044,620 B2 | 6/2021 | Suba et al. | |
| 2019/0095517 A1* | 3/2019 | Park | G06F 16/22 |
| 2021/0243595 A1 | 8/2021 | Buck et al. | |
| 2021/0337354 A1* | 10/2021 | Faustino | H04W 4/029 |
| 2022/0022344 A1* | 1/2022 | Jose | H05K 7/20745 |

OTHER PUBLICATIONS

Voit, et al., "Subscription to YANG Notifications", Request for Comments 8639, Sep. 2019, 77 pages, IEEE Trust.
Clemm, et al, "Subscription to YANG Notifications for Datastore Updates", Request for Comments 8641, Sep. 2019, 58 pages, IETF Trust.
"Location telemetry support in IoT Central is now available", online: https://azure.microsoft.com/en-us/updates/location-telemetry-support-in-iot-central/, Jul. 2019, accessed Apr. 28, 2022, 3 pages, Microsoft.

* cited by examiner

*Primary Examiner* — Michael T Vu
(74) *Attorney, Agent, or Firm* — Lee & Hayes, P.C.

(57) ABSTRACT

In one embodiment, a mobile node in a wireless network determines a physical location of the mobile node. The mobile node obtains telemetry data. The mobile node makes a comparison between the physical location of the mobile node and a location-based telemetry reporting policy. The mobile node sends, based on the comparison, the telemetry data via the wireless network.

20 Claims, 9 Drawing Sheets

LOCATION
402c

LOCATION
402a

LOCATION
402b

ON-LOCATION TELEMETRY SUBSCRIPTIONS

TECHNICAL FIELD

The present disclosure relates generally to computer networks, and, more particularly, to on-location telemetry subscriptions.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. In other words, the IoT has expanded to include many operational technology (OT) networks, as well.

Typically, telemetry reporting by IoT devices has been time-centric. This is done primarily to help conserve power, as many IoT devices are battery-powered. For instance, a temperature sensor may only report a temperature measurement every hour, allowing it to conserve power by entering into a sleep mode in the interim. In further cases, an IoT device may not even report a reading at a predefined time, unless its current measurement differs from its previously-reported measurement(s) by a threshold amount.

While time-centric telemetry reporting is suitable in many cases, the IoT is rapidly evolving to include many non-stationary devices. Indeed, many OT environments such as mines, entertainment rides, passenger systems, and the like, are increasingly deploying mobile nodes, such as autonomous vehicles and other devices, whose locations are not fixed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a mobile node in a wireless network determines a physical location of the mobile node. The mobile node obtains telemetry data. The mobile node makes a comparison between the physical location of the mobile node and a location-based telemetry reporting policy. The mobile node sends, based on the comparison, the telemetry data via the wireless network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
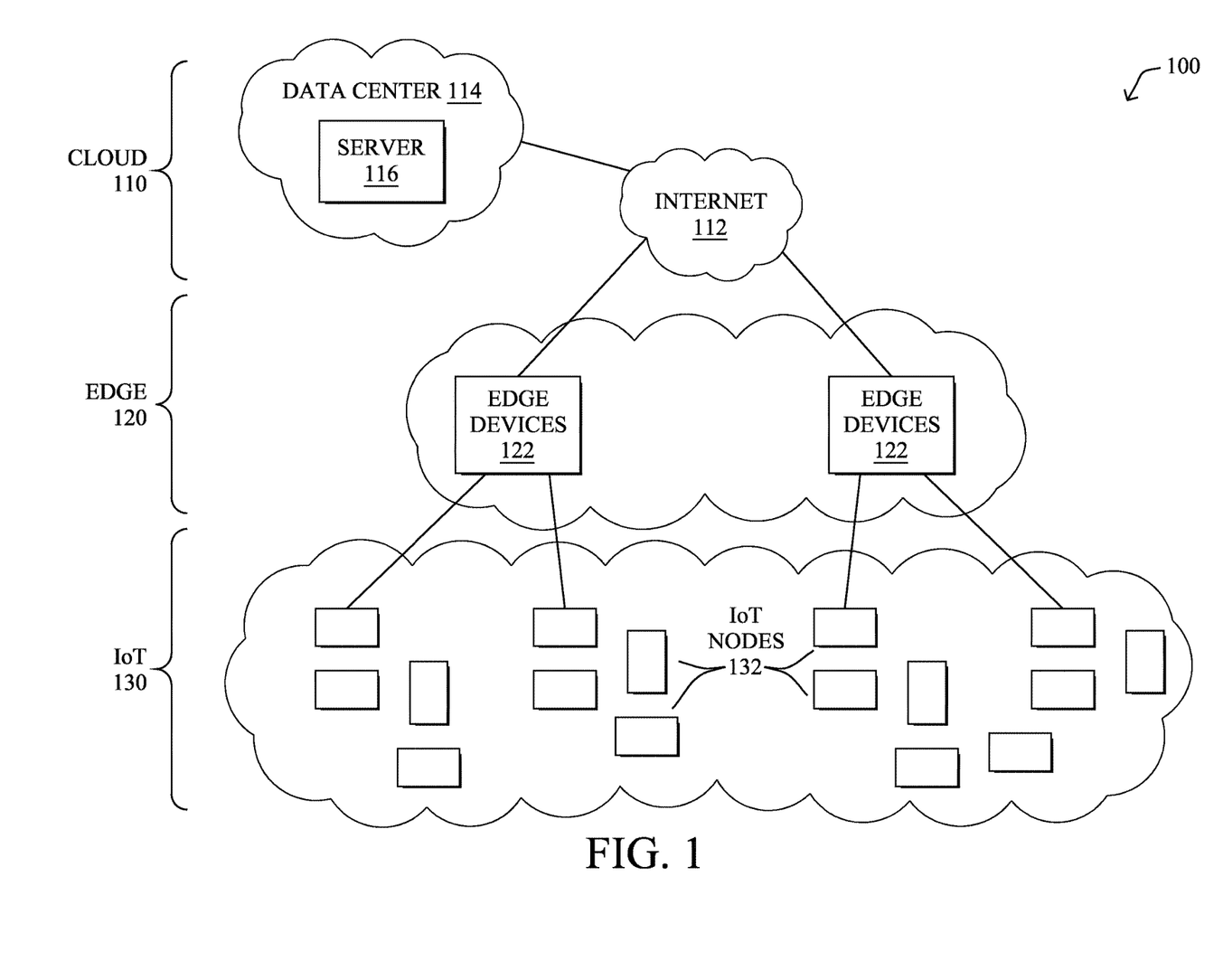
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
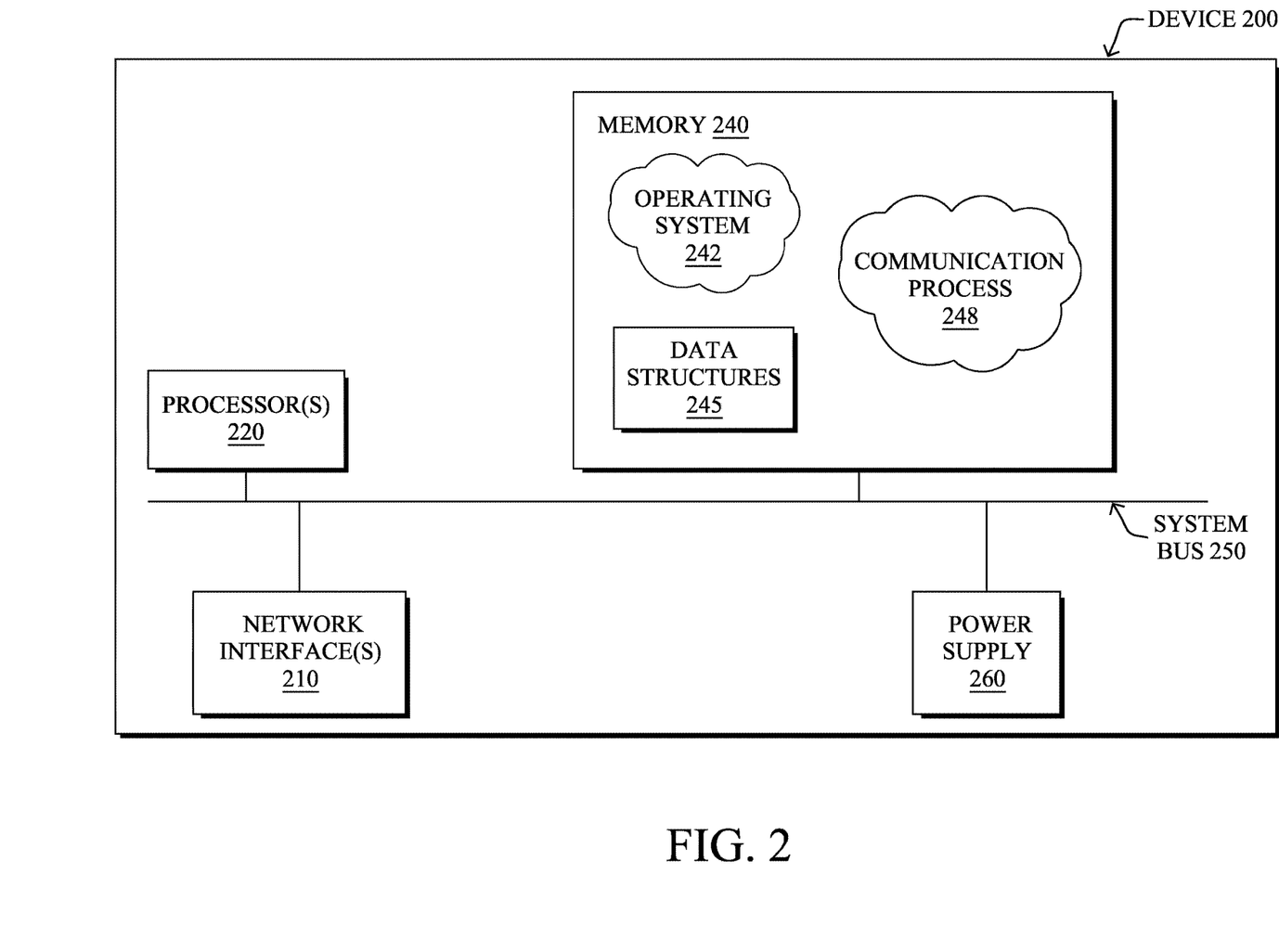
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below (e.g., a client device, an access point, a network controller, etc.). The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
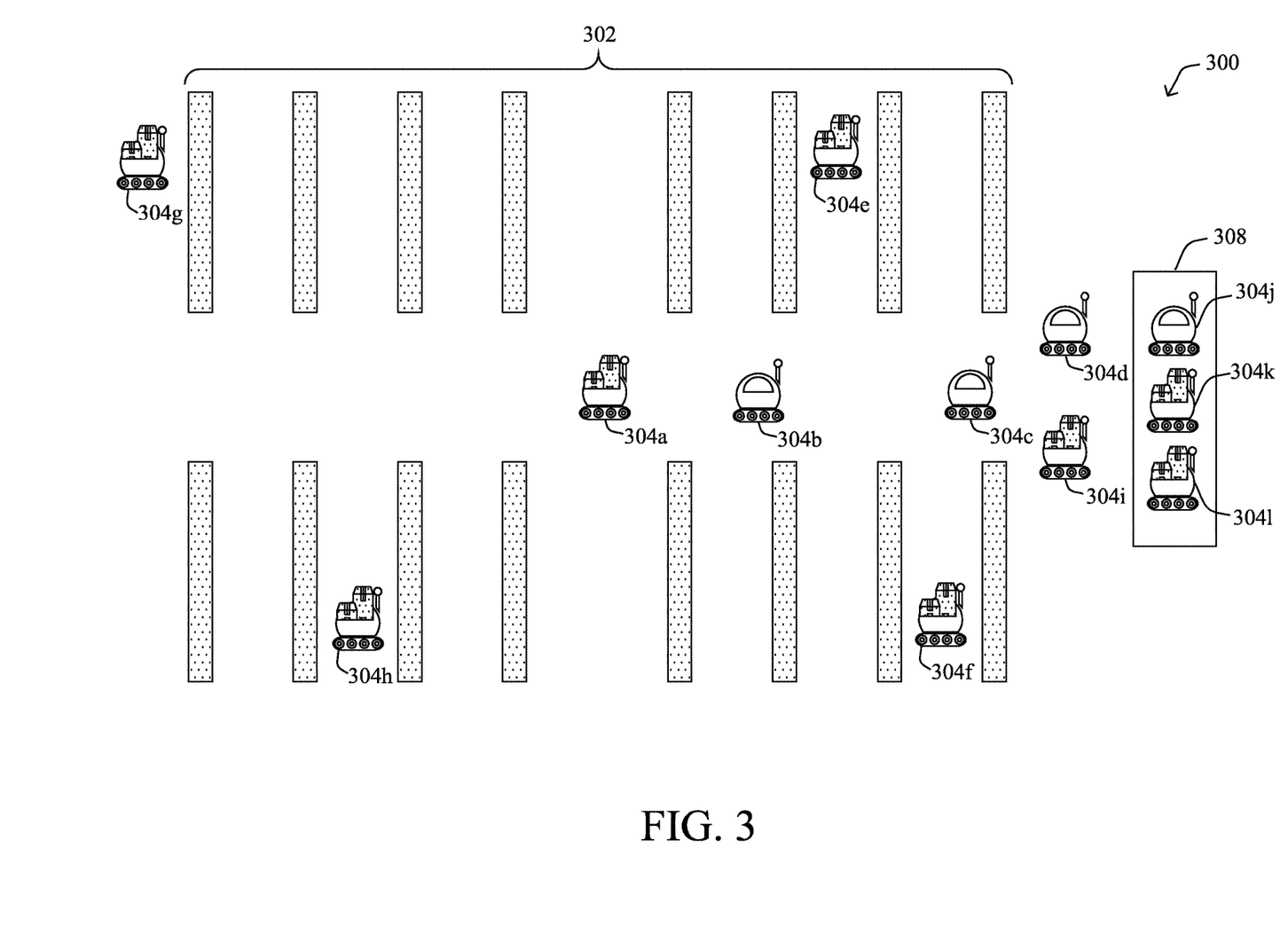
FIG. 3 illustrates an example industrial wireless network deployed in a warehouse.

FIG. 3 illustrates an example warehouse 300. As shown, assume that a plurality of inventory racks 302 are distributed throughout warehouse 300 for purposes of storing items. As would be appreciated, inventory racks 302 are optional and other forms of storage systems may be deployed throughout warehouse 300, in other cases. For instance, warehouse 300 may also include containers, holding pens, or the like, in which various items may be stored.

To aid in the storage and/or retrieval of the items in the warehouse, any number of mobile robots 304 may be deployed, such as mobile robots 302a-304l shown. In general, each mobile robot 304 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 304 may also include mechanisms to automatically load and/or unload items, such as forklifts, mechanical claws, or the like. In other embodiments, mobile robots 304 may require the assistance of human workers to load and unload items to and from them, such as at a pack-out area 308.

In some instances, mobile robots 304 may be partially or fully autonomous, allowing them to complete their tasks, independently. For instance, a particular mobile robot 304 may be sent a task list that indicates the set of items that the robot is to retrieve from within warehouse 300, navigation information if so needed, or any other information that may be required for the performance of its retrieval functions.

As noted above, IoT devices are increasingly being deployed to operational technology (OT) environments, with many such devices now taking the form of mobile nodes that move autonomously, semi-autonomously, or fully under supervisory control at all time. For instance, many mines, passenger systems (e.g., train systems, etc.), entertainment rides (e.g., at amusement parks), and the like, now include (semi-) autonomous vehicles or robots.

Traditionally, telemetry reporting in the IoT has been time-centric, with nodes reporting at scheduled times. Doing so allows the reporting devices to conserve power by entering into a sleep mode when not collecting or reporting a measurement. Indeed, many IoT devices today rely on time-based telemetry reporting policies that cause a device to report its collected telemetry data on a periodic basis and/or whenever a data change is detected. However, this approach is best suited for stationary devices that require little power consumption, in general.

In the case of mobile nodes in a wireless IoT network, telemetry collection and reporting using a time-based telemetry reporting policy lacks flexibility and capability. First, unlike their stationary counterparts, mobile nodes may be exposed to different types of telemetry data and/or telemetry data whose importance varies by location, during their travels. For instance, measuring windspeed indoors may be of little importance whereas windspeed measurements may be quite useful when the mobile node is outside.

On-Location Telemetry Subscriptions

The techniques introduced herein provide for telemetry reporting policies that are location-based. In various aspects, such location-based telemetry reporting policies may control which telemetry data is reported by a mobile node, how it is reported, and/or at which locations.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Specifically, in various embodiments, a mobile node in a wireless network determines a physical location of the mobile node. The mobile node obtains telemetry data. The mobile node makes a comparison between the physical location of the mobile node and a location-based telemetry reporting policy. The mobile node sends, based on the comparison, the telemetry data via the wireless network.

Figure 4A:
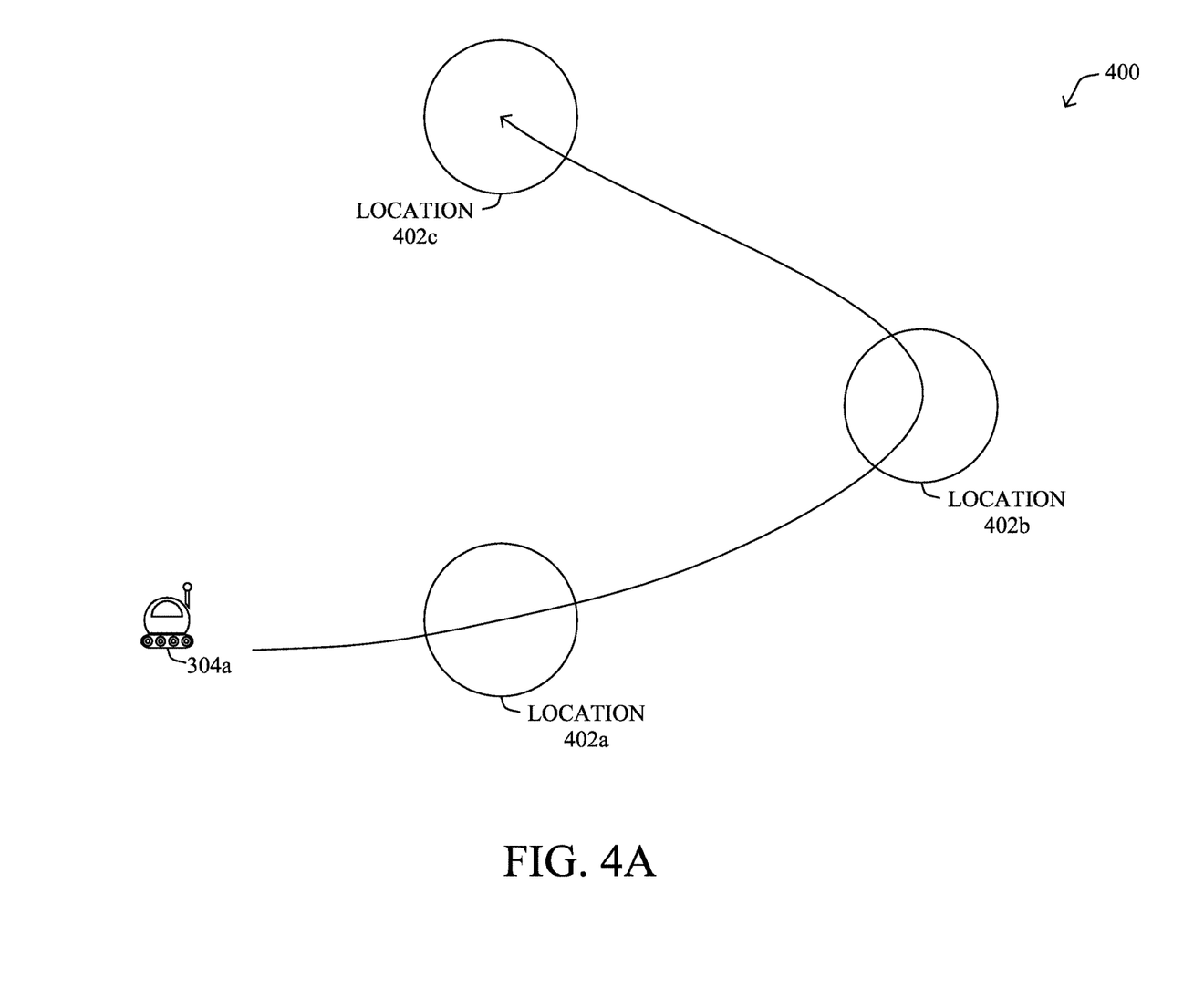
FIGS. 4A-4E illustrate examples of a mobile node reporting telemetry according to a location-based telemetry reporting policy.

Operationally, FIGS. 4A-4E illustrate examples of a mobile node reporting telemetry according to a location-based telemetry reporting policy, according to various embodiments. As shown in FIG. 4A and continuing the example of FIG. 3, assume that there is a mobile robot 304a that traverses a path 400 over time that includes locations 402a-402c.

According to various embodiments, mobile robot 304a may be configured with a location-based telemetry reporting policy that controls its reporting of telemetry data throughout its travels. In some embodiments, mobile robot 304a may be configured with such a schedule by default, by another node in the network (e.g., through an exchange performed with another mobile robot, etc.), or by a supervisory service overseeing at least a portion of its operation. Note also that path 400 may be predefined as the path of travel for mobile robot 304a or determined by mobile robot 304a dynamically, as in the case of mobile robot 304a being semi- or fully-autonomous.

The telemetry data obtained by mobile robot 304a may include any or all of the following:
- Measurements taken by one or more on-board sensors of mobile robot 304a (e.g., a temperature sensor, a light sensor, a pressure sensor, a windspeed sensor, etc.).
- Measurements indicative of the health of mobile robot 304a (e.g., its CPU load, its available memory, its cargo capacity, its battery level, etc.).
- Measurements regarding the wireless network (e.g., received signal strength indicator information, access point association information, etc.).
- Measurements captured by another node in the network and sent to mobile robot 304a for reporting (e.g., a BLE stream, etc.).
- Etc.

As would be appreciated, the above examples are intended to be non-limiting and the types of telemetry data that could be captured and reported by a mobile node in a wireless network can take a wide variety of different forms. In addition, the types of telemetry data may also vary, depending on the type of mobile node, which could take the form of a passenger vehicle (e.g., a train, automobile, aircraft, amusement park ride, boat, etc.) or robotic device (e.g., a mine cart, a drone, etc.).

In various embodiments, the location-based telemetry reporting policy of mobile robot 304a may specify any or all of the following:
- The type(s) of telemetry data that mobile robot 304a is to obtain at any given location.
- The type(s) of telemetry data that mobile robot 304a is to report at any given location.
- The destination(s) to which mobile robot 304a is to send the telemetry data from any given location. Note that the policy may also specify different destinations for different types of telemetry data to be sent by mobile robot 304a from that location, as well.
- The transmission parameters that mobile robot 304a is to use at any given location, such as its transmission rate/bandwidth usage, any data filters to be applied to the reported telemetry data, etc.
- Any computations that mobile robot 304a is to perform with respect to the reported telemetry data (e.g., a computed change in measurements between locations, etc.)
- A dampening mechanism that mobile robot 304a is to apply, to vary its telemetry reporting based on the changes in the telemetry data as a function of distance.
- Etc.

Figure 4B:
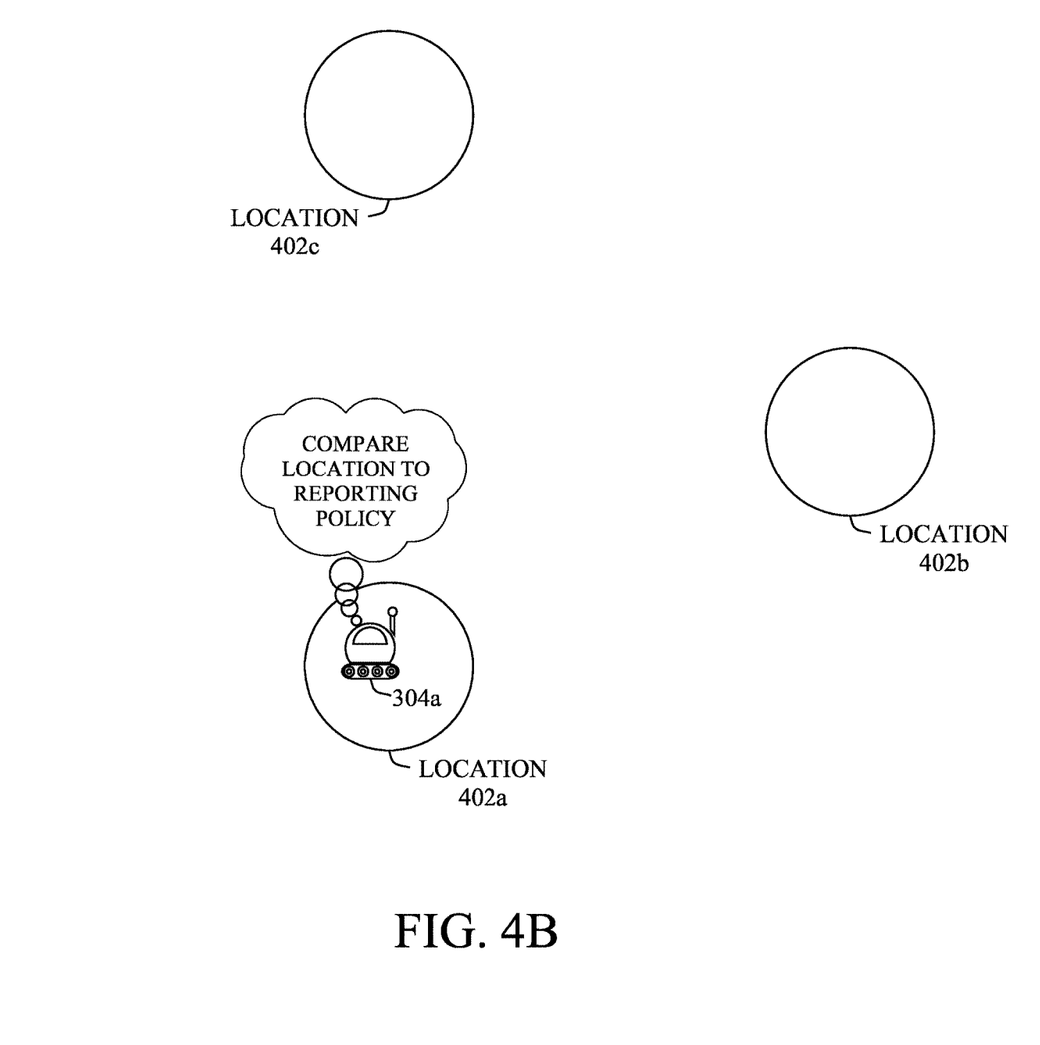

In FIG. 4B, consider now the case in which mobile robot 304a has navigated to location 402a. In such a case, mobile robot 304a may compare its current location to its location-based telemetry reporting policy. Various possibilities exist with respect to mobile robot 304a determining its location such as any or all of the following:
- Use of a Global Positioning System (GPS) receiver onboard mobile robot 304a
- Use of another satellite-based positioning system receiver onboard mobile robot 304a (e.g., Galileo, GLONASS, BeiDou, or the like).
- Location services of the wireless network (e.g., based on signal strength, angle of arrival, time of flight, etc.)
- Triangulation with other mobile and/or stationary nodes
- Special indicia at the physical location (e.g., a barcode, a light signal, etc.)
- Etc.

Figure 4C:
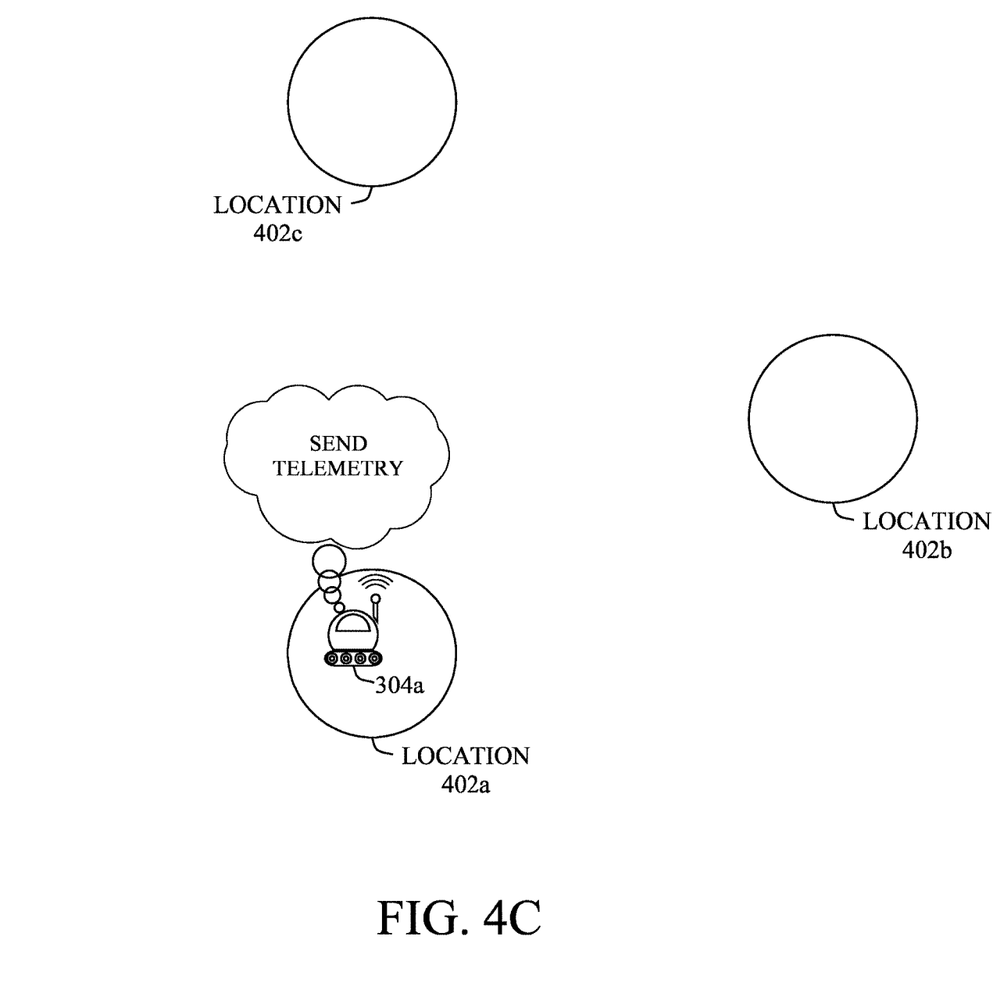

Based on this comparison, mobile robot 304a may determine that it is to send certain telemetry data from location 402a and send that data via the wireless network, as shown in FIG. 4C. For instance, mobile robot 304a may report its current cargo load or capacity when located at location 402a, in accordance with its location-based telemetry reporting policy. Of course, since the reporting policy is location-based, this may also naturally mean that it similarly prevents mobile robot 304a from reporting certain types of telemetry data while located at location 402a, as well.

In various embodiments, the location-based telemetry reporting policy of mobile robot 304a may also specify how mobile robot 304a is to send telemetry data from location 402a. For instance, the policy may control which transmission rate is to be used by mobile robot 304a at location 402a, to which access point(s) mobile robot 304a is to send the telemetry data, any data filters that mobile robot 304a is to apply to the telemetry data to be sent (e.g., mobile robot 304a may only report its cargo capacity when it has available capacity), etc.

Figure 4D:
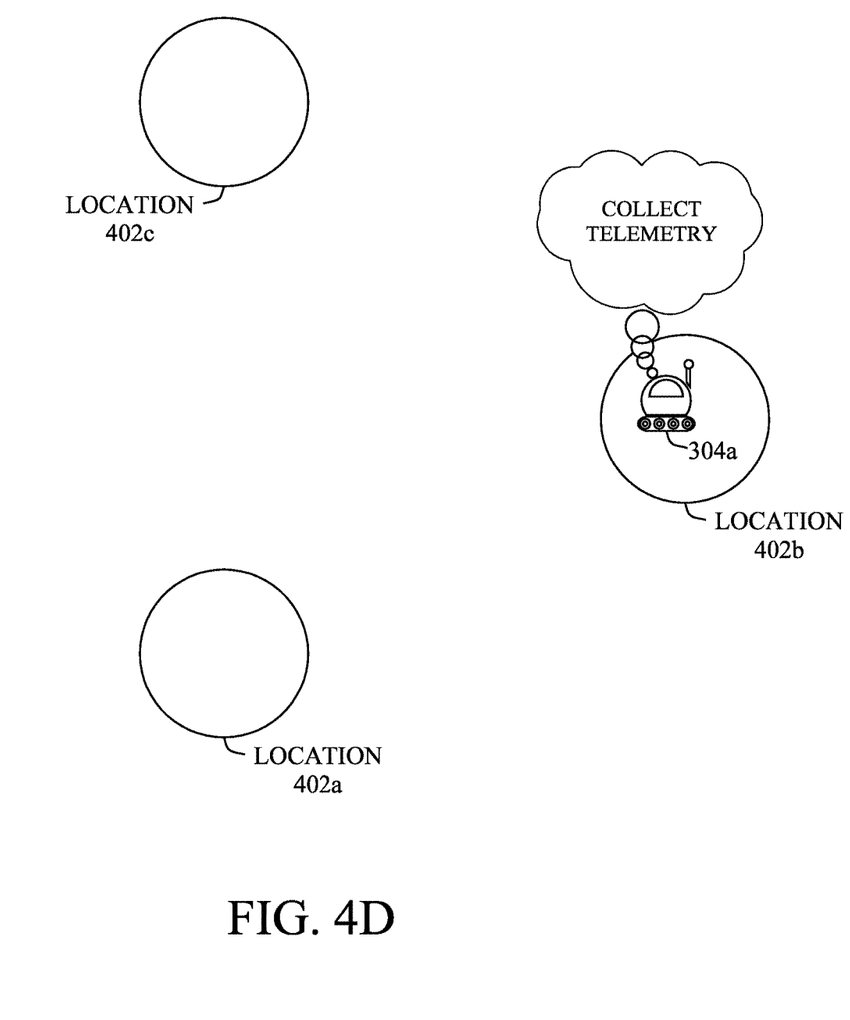

In FIG. 4D, assume now that mobile robot 304a next navigates to location 402b. Similar to operations at location 402a, mobile robot 304a may again compare its current location to its telemetry reporting policy. In some embodiments, as shown, assume now that the policy indicates that mobile robot 304a is to collect a certain telemetry measurement, or set of measurements, while at location 402b. However, the policy may also dictate that the measurement or set of measurements are not to be reported from location 402b. For instance, the policy may specify that mobile robot 304a is to hold off on reporting the collected telemetry until it reaches a subsequent location, such as location 402c, in one embodiment.

Figure 4E:
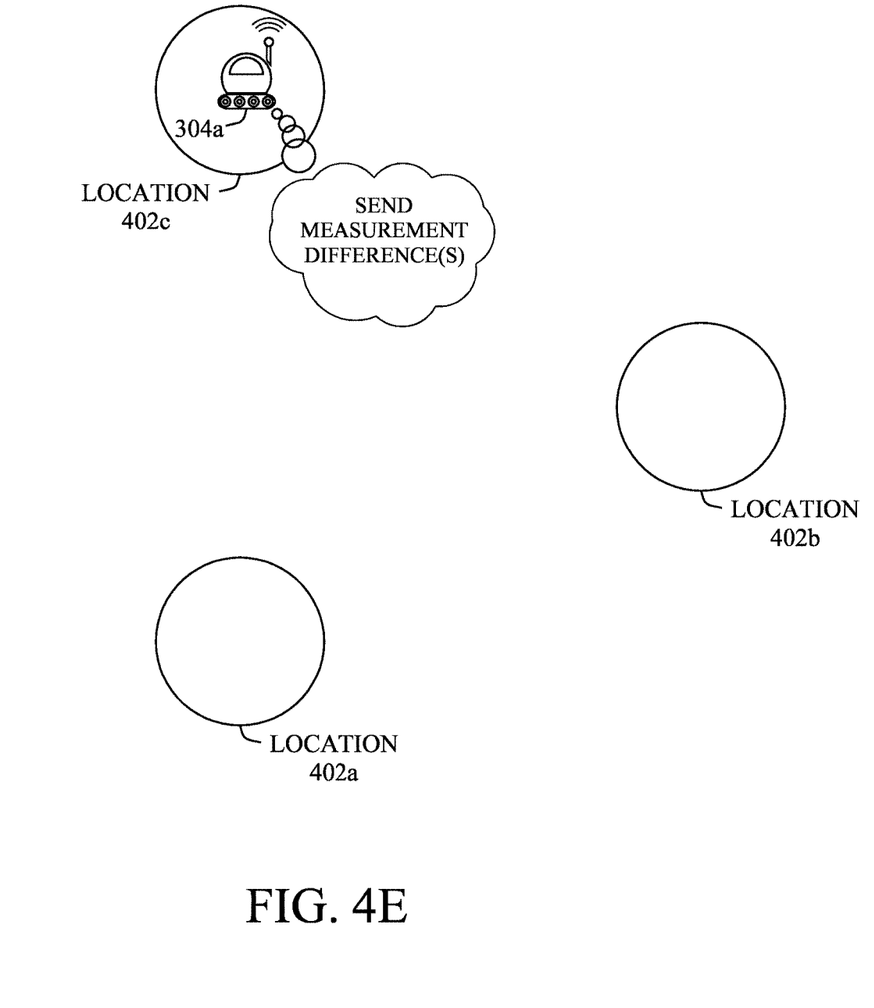

In further embodiments, the location-based telemetry reporting policy of mobile robot 304a may specify a computation that mobile robot 304a is to perform using the telemetry data that it obtained at location 402b. For instance, as shown in FIG. 4E, the policy may specify that mobile robot 304a is to collect new measurement(s) at location 402c, compute the difference(s) with those obtained at location 402b, and report the difference(s). In one embodiment, the policy may also specify that mobile robot 304a only needs to report the measurement difference(s) when the difference exceeds a predefined threshold.

A further variation of the above would be for the reporting policy to cause mobile robot 304a to provide telemetry data changes together with a location (e.g., for each meter, foot, inch, etc.) where mobile robot 304a moves. In another embodiment, the policy may also enforce a "dampening distance" to its reporting. For instance, assume that mobile robot 304a only reports the measurement change(s) every k-number of meters. If the data changes every inch, dampening for each meter would result in mobile robot 304a only sending what changed from the prior meter.

Figure 5:
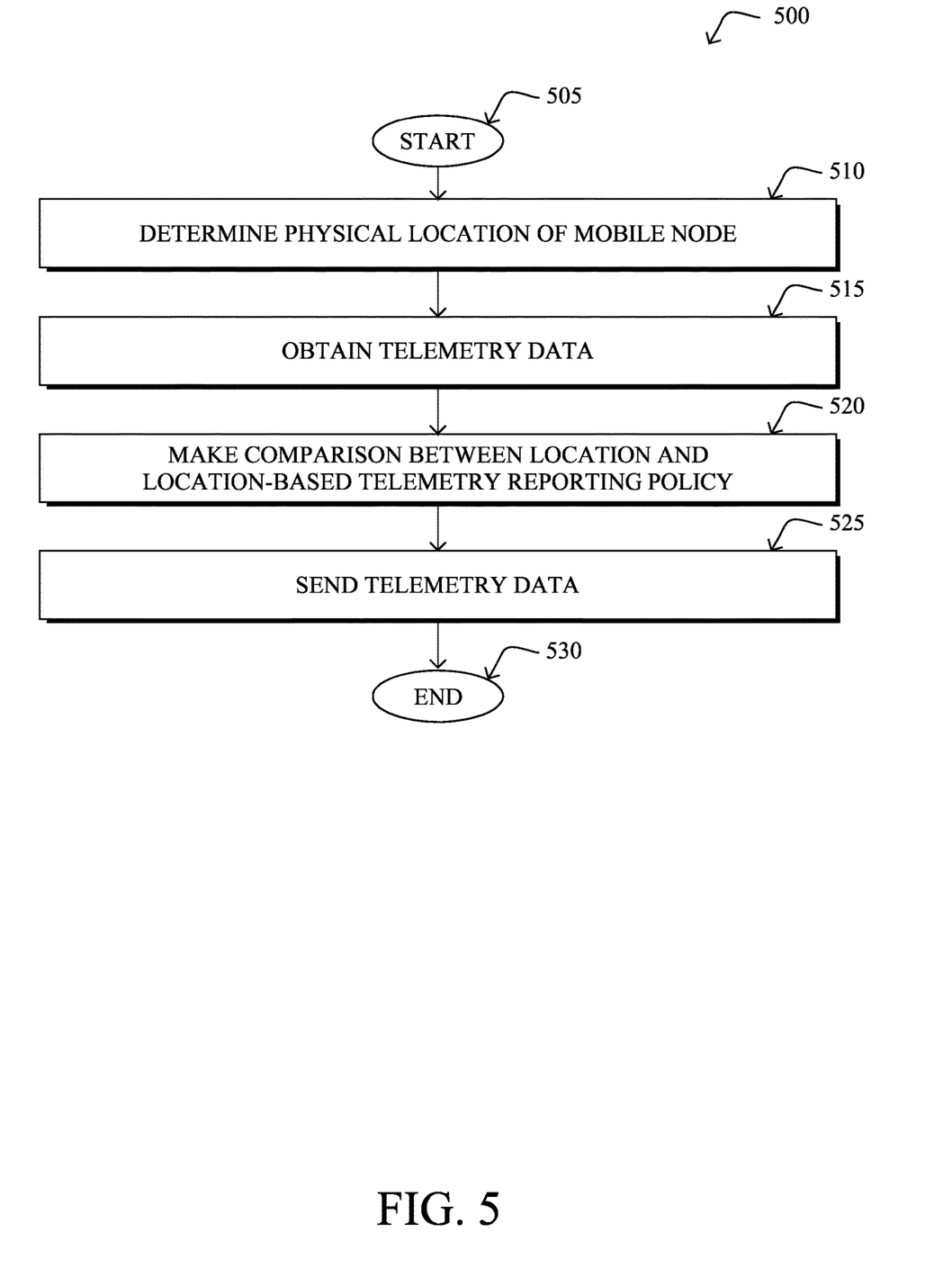
FIG. 5 illustrates an example simplified procedure for reporting telemetry according to a location-based telemetry reporting policy.

FIG. 5 illustrates an example simplified procedure for reporting telemetry according to a location-based telemetry reporting policy, in accordance with one or more embodiments described herein. The procedure 500 may start at step 505, and continues to step 510, where, as described in greater detail above, a mobile node (e.g., device 200) in a wireless network may determine a physical location of the mobile node. For example, the mobile node may determine its location using a Global Positioning System (GPS) or other satellite system receiver, location services of the wireless network (e.g., based on signal strength, angle of arrival, time of flight, etc.), triangulation with other mobile nodes, special indicia at the physical location, combinations thereof, or the like. In various embodiments, the mobile node may move autonomously or semi-autonomously to the physical location.

At step 515, as detailed above, the mobile node may obtain telemetry data. In some embodiments, the mobile node obtains the telemetry data at a prior physical location of the mobile node. In further embodiments, the mobile node obtains the telemetry data at the physical location of the mobile node. In general, the telemetry data may comprise a measurement taken by a sensor of the mobile node or another node, a status of the mobile node (e.g., its CPU usage, its cargo capacity, its battery level, etc.), or the like. In some embodiments, the telemetry data comprises a difference between a measurement taken by the mobile node at the physical location and a measurement taken by the mobile node at a prior physical location of the mobile node.

At step 520, the mobile node may make a comparison between the physical location of the mobile node and a location-based telemetry reporting policy, as described in greater detail above. In various embodiments, the location-based telemetry reporting policy prevents the mobile node from reporting the telemetry data when the mobile node is located at a second physical location. In some embodiments, the mobile node may do so in part by determining that the telemetry data should be reported, based on the physical location of the mobile node and on a type of the telemetry data. In one embodiment, the mobile node may receive the location-based telemetry reporting policy from a supervisory service.

At step 525, as detailed above, the mobile node may send, based on the comparison, the telemetry data via the wireless network. In some embodiments, the mobile node sends the telemetry data using a transmission rate specified by the location-based telemetry reporting policy for the physical location of the mobile node. In further embodiments, the mobile node sends an indication of the physical location of the mobile node in conjunction with the telemetry data. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein allow for location-based telemetry subscriptions through the use of location-based telemetry reporting policies. As would be appreciated, such subscriptions may be implemented through the use of location-based telemetry reporting policies that allow a mobile node that moves between physical locations to vary what and/or how it reports, based on its current location. For instance, the mobile node may report one type of telemetry data at one location and a different type of telemetry data at another location. Similarly, the mobile node may collect one type of telemetry data at one location and report it at another location. In further cases, the mobile node may also vary the parameters of its telemetry reporting, based on its location, such as by varying its telemetry collection or reporting frequency, data filtering, transmission rate/bandwidth usage, etc.

While there have been shown and described illustrative embodiments for on-location telemetry subscriptions, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed in certain settings, such as a factory or warehouse, the techniques are not limited as such and can be deployed in any number of different settings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   determining, by a mobile node that is autonomously or semi-autonomously movable within a wireless network, a current physical location of the mobile node using a positioning system or location service;
   obtaining, by a mobile node, telemetry data associated with an environment or an internal status of the mobile node;
   making, by the mobile node, a comparison between the current physical location of the mobile node and a location-based telemetry reporting policy, the location-based telemetry reporting policy specifying one or more telemetry data types to be reported from the current physical location; and
   sending, by the mobile node and based on the comparison indicating that the telemetry data is to be reported, the telemetry data and an indication of the current physical location via the wireless network using one or more transmission parameters specified by the location-based telemetry reporting policy.

2. The method as in claim 1, wherein the location-based telemetry reporting policy prevents the mobile node from reporting the telemetry data when the mobile node is located at a second physical location.

3. The method as in claim 1, wherein making the comparison between the current physical location of the mobile node and the location-based telemetry reporting policy comprises:
   determining, by the mobile node, that the telemetry data should be reported, based on the current physical location of the mobile node and on a type of the telemetry data.

4. The method as in claim 1, further comprising:
   receiving, at the mobile node, the location-based telemetry reporting policy from a supervisory service.

5. The method as in claim 1, wherein the mobile node obtains the telemetry data at a prior physical location of the mobile node.

6. The method as in claim 1, wherein the mobile node obtains the telemetry data at the current physical location of the mobile node.

7. The method as in claim 1, wherein the telemetry data comprises a difference between a measurement taken by the mobile node at the current physical location and a measurement taken by the mobile node at a prior physical location of the mobile node.

8. The method as in claim 1, wherein sending the telemetry data via the wireless network comprises:
sending the telemetry data using a transmission rate specified by the location-based telemetry reporting policy for the current physical location of the mobile node.

9. The method as in claim 1, wherein sending the telemetry data via the wireless network comprises:
sending an indication of the current physical location of the mobile node in conjunction with the telemetry data.

10. The method as in claim 1, wherein the mobile node moves autonomously or semi-autonomously to the current physical location.

11. An apparatus, comprising:
one or more network interfaces to communicate with a wireless network;
a processor coupled to the one or more network interfaces and configured to execute one or more processes; and
a memory configured to store a process that is executable by the processor, the process when executed configured to:
determine a current physical location of the apparatus using a positioning system or location service, wherein the apparatus is autonomously or semi-autonomously movable within the wireless network;
obtain telemetry data associated with an environment or an internal status of the apparatus;
make a comparison between the current physical location of the apparatus and a location-based telemetry reporting policy, the location-based telemetry reporting policy specifying one or more telemetry data types to be reported from the current physical location; and
send, based on the comparison indicating that the telemetry data is to be reported, the telemetry data and an indication of the current physical location via the wireless network using one or more transmission parameters specified by the location-based telemetry reporting policy.

12. The apparatus as in claim 11, wherein the location-based telemetry reporting policy prevents the apparatus from reporting the telemetry data when the apparatus is located at a second physical location.

13. The apparatus as in claim 11, wherein the apparatus makes the comparison between the current physical location of the apparatus and the location-based telemetry reporting policy by:
determining that the telemetry data should be reported, based on the current physical location of the apparatus and on a type of the telemetry data.

14. The apparatus as in claim 11, wherein the process when executed is further configured to:
receive the location-based telemetry reporting policy from a supervisory service.

15. The apparatus as in claim 11, wherein the apparatus obtains the telemetry data at a prior physical location of the apparatus.

16. The apparatus as in claim 11, wherein the apparatus obtains the telemetry data at the current physical location of the apparatus.

17. The apparatus as in claim 11, wherein the telemetry data comprises a difference between a measurement taken by the apparatus at the current physical location and a measurement taken by the apparatus at a prior physical location of the apparatus.

18. The apparatus as in claim 11, wherein the apparatus sends the telemetry data via the wireless network by:
sending the telemetry data using a transmission rate specified by the location-based telemetry reporting policy for the current physical location of the apparatus.

19. The apparatus as in claim 11, wherein the apparatus sends the telemetry data via the wireless network by:
sending an indication of the current physical location of the apparatus in conjunction with the telemetry data.

20. A tangible, non-transitory, computer-readable medium storing program instructions that cause a mobile node that is autonomously or semi-autonomously movable within in a wireless network to execute a process comprising:
determining a current physical location of the mobile node using a positioning system or location service;
obtaining telemetry data associated with an environment or an internal status of the mobile node;
making a comparison between the current physical location of the mobile node and a location-based telemetry reporting policy, the location-based telemetry reporting policy specifying ore telemetry data types to be reported from the current physical location; and
sending, based on the comparison indicating that the telemetry data is to be reported, the telemetry data and an indication of the current physical location via the wireless network using one or more transmission parameters specified by the location-based telemetry reporting policy.

* * * * *